United States Patent
Hesse et al.

(10) Patent No.: US 9,061,376 B2
(45) Date of Patent: Jun. 23, 2015

(54) METHOD AND DEVICE FOR LASER MATERIAL PROCESSING OF A WORKPIECE

(71) Applicant: TRUMPF Werkzeugmaschinen GmbH + Co. KG, Ditzingen (DE)

(72) Inventors: Tim Hesse, Ditzingen (DE); Tobias Kaiser, Leonberg (DE); Nicolai Speker, Pleidelsheim (DE); Tobias Haecker, Stuttgart (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 0 days.

(21) Appl. No.: 13/708,016

(22) Filed: Dec. 7, 2012

(65) Prior Publication Data
US 2013/0119026 A1 May 16, 2013

Related U.S. Application Data

(63) Continuation of application No. PCT/EP2011/059526, filed on Jun. 8, 2011.

(30) Foreign Application Priority Data

Jun. 8, 2010 (DE) .................. 10 2010 029 791

(51) Int. Cl.
*B23K 26/00* (2014.01)
*B23K 26/38* (2014.01)
(Continued)

(52) U.S. Cl.
CPC ............ *B23K 26/38* (2013.01); *B23K 26/0608* (2013.01); *B23K 26/0613* (2013.01); *B23K 26/0734* (2013.01); *B23K 26/14* (2013.01); *B23K 26/08* (2013.01)

(58) Field of Classification Search
CPC .......... B23K 26/0608; B23K 26/0613; B23K 26/08; B23K 26/14; B23K 26/38; B23K 26/0734
USPC ............. 219/121.67, 121.72, 121.68, 121.69, 219/121.73, 121.75, 121.8
See application file for complete search history.

(56) References Cited

U.S. PATENT DOCUMENTS

| 5,637,243 A | 6/1997 | Sato et al. |
| 6,603,504 B1 | 8/2003 | Son et al. |

(Continued)

FOREIGN PATENT DOCUMENTS

| CN | 101670493 | 3/2010 |
| DE | 102007024701 A1 | 11/2008 |

(Continued)

OTHER PUBLICATIONS

"High Power Radially Polarized Light Generated from Photonic Crystal Segement Half-Wave-Plate", 2007 Optical Society of America, P.B. Phua.*

(Continued)

*Primary Examiner* — Dana Ross
*Assistant Examiner* — Joseph Iskra
(74) *Attorney, Agent, or Firm* — Fish & Richardson P.C.

(57) ABSTRACT

Cutting a workpiece with a laser beam includes using the laser beam to melt and/or vaporize at least a portion of the workpiece, and moving at least one of the workpiece and the laser beam relative to one another to form a cutting front on the workpiece, in which the laser beam includes either at least two different radially polarized beam portions offset relative to each along an advancing direction of the laser beam, or multiple laser beam strips extending along the advancing direction of the laser beam. Each laser beam strip has a different linear polarization direction, and the advancing direction corresponds to a direction along which the workpiece is cut by the laser beam.

13 Claims, 8 Drawing Sheets

(51) Int. Cl.
*B23K 26/06* (2014.01)
*B23K 26/073* (2006.01)
*B23K 26/14* (2014.01)
*B23K 26/08* (2014.01)

(56) References Cited

U.S. PATENT DOCUMENTS

| | | | |
|---|---|---|---|
| 6,885,502 B2 * | 4/2005 | Schuster | 359/486.03 |
| 2010/0176102 A1 | 7/2010 | Petring et al. | |
| 2010/0176103 A1 | 7/2010 | Schulz et al. | |
| 2013/0017670 A1 | 1/2013 | Fukuyo et al. | |

FOREIGN PATENT DOCUMENTS

| | | | |
|---|---|---|---|
| DE | 102007024700 A1 | | 12/2008 |
| DE | 102007059987 | * | 7/2009 |
| DE | 102008053397 A1 | | 12/2009 |
| KR | 100131710 | | 4/1998 |
| KR | 100304784 | | 9/2001 |
| WO | 9316838 A2 | | 9/1993 |
| WO | WO2006118809 A2 | | 11/2006 |
| WO | 2009040103 A1 | | 4/2009 |
| WO | 2009074140 A2 | | 6/2009 |
| WO | 2010016028 A1 | | 2/2010 |
| WO | WO2010033723 | | 3/2010 |

OTHER PUBLICATIONS

Notification of Transmittal of Translation of the International Preliminary Report on Patentability from corresponding PCT Application No. PCT/EP2011/059526, mailed Dec. 20, 2012, 15 pages.
Nesterov et al., "Laser Beams with Axially Symmetric Polarization", J. Phys. D: Appl. Phys. 33, 2000, pp. 1817-1822.
Niziev et al., "Influence of Beam Polarization on Laser Cutting Efficiency", J. Phys. D: Appl. Phys. 32, 1999, pp. 1455-1461.
O'Neill, Bill, "Laser Cutting: a technology with some surprises in store", The Laser User, issue 51, 2008, pp. 34-36.
International Search Report from corresponding PCT Application No. PCT/EP2011/059526, mailed Feb. 23, 2012, 10 pages.
Phua et al., "High power radially polarized light generated from photonic crystal segmented half-wave-plate", Physics, vol. 10, 2007, 6 pages.
Korean Office Action for Application No. 10-2013-7000475 dated Oct. 8, 2014 with English Translation.

* cited by examiner

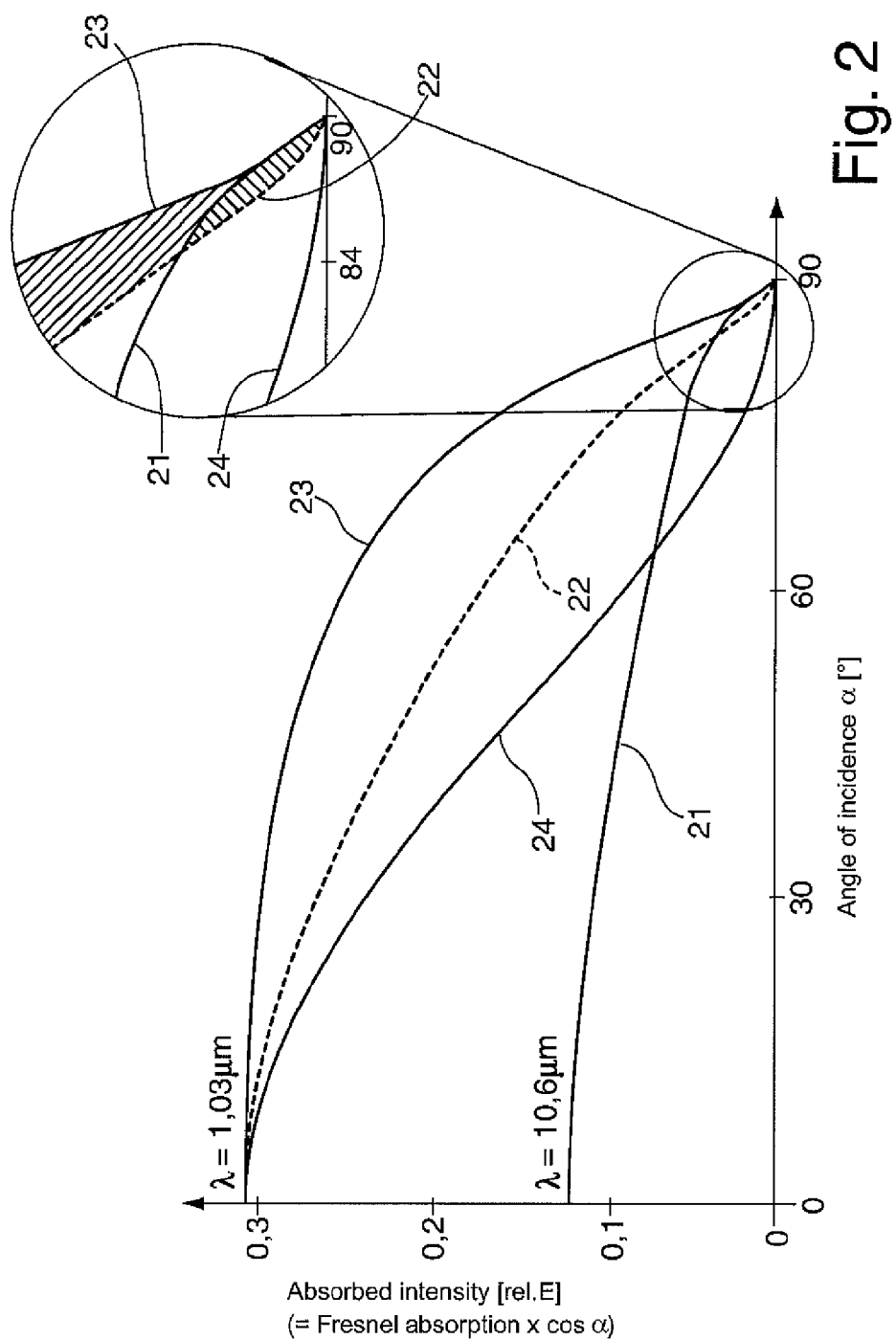

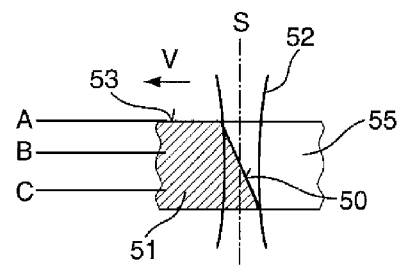
Fig. 5
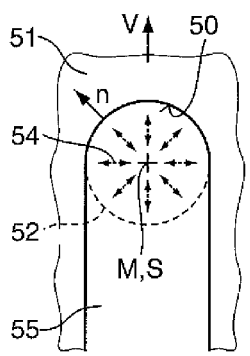 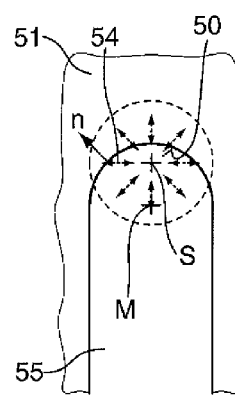 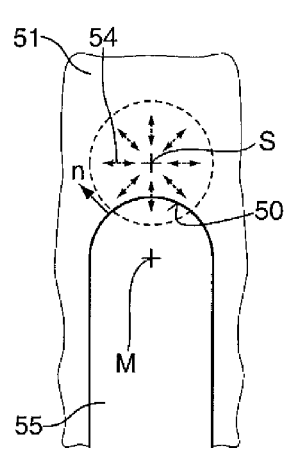
Fig. 6a  Fig. 6b  Fig. 6c
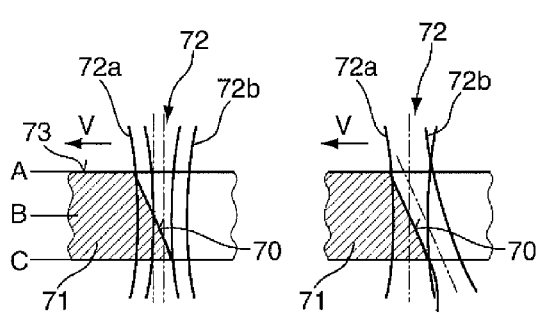 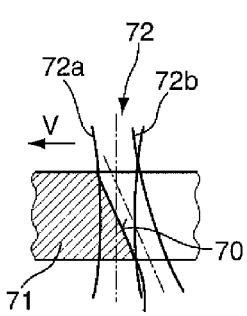 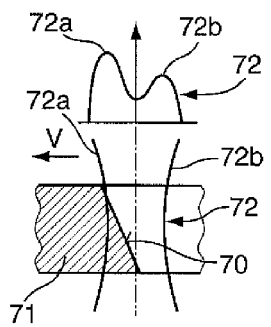
Fig. 7a  Fig. 7b  Fig. 7c

METHOD AND DEVICE FOR LASER MATERIAL PROCESSING OF A WORKPIECE

CROSS REFERENCE TO RELATED APPLICATIONS

This application is a continuation of and claims priority under 35 U.S.C. §120 to PCT Application No. PCT/EP2011/059526, filed on Jun. 8, 2011, which claimed priority to German Application No. 10 2010 029 791.7, filed on Jun. 8, 2010. The contents of both of these priority applications are hereby incorporated by reference in their entirety.

BACKGROUND

The present disclosure relates to methods and devices for laser material processing, such as laser cutting and/or laser welding, of a workpiece Depending on the application and availability of installations, various laser beam sources are used in laser material processing operations. For example, for laser cutting operations, $CO_2$ lasers having a laser wavelength of approximately 10 μm have been preferably used in the past, whereas solid-state lasers having a wavelength in the range of about 1 μm are becoming increasingly useful for laser fusion cutting operations due to an increase in cutting speed and improved energy efficiency.

In order to further increase the efficiency of the method used, attempts are often made to maximize the amount of energy coupled from the laser beam to the workpiece. For example, in WO 2010/016028 A1, azimuthally polarized radiation is used for the laser cutting operation. Due to the adaptation of the polarization, the absorption at the irradiation front is increased.

Compared to cutting operations performed with a laser having a wavelength of approximately 10 μm (e.g., a $CO_2$ laser), however, the cutting operations that use a laser having a wavelength of 1 μm produce results that have a relatively high cutting edge roughness, corrugation and burr formation. As the workpiece (e.g., a metal sheet) becomes thicker, those effects increase. When laser cutting or laser welding is performed using a wavelength in the range of 1 μm with random polarization, an undulating irradiation front that includes local spatial disturbances, such as waves, can be formed in the workpiece. As a result of the formation of the undulating irradiation front, the laser radiation is incident on the workpiece at different angles. Since the Fresnel absorption of the laser radiation is dependent on the angle of incidence, the different angles of incidence at the local spatial disturbances of the undulating irradiation front lead to poor local Fresnel absorption behavior. The poor absorption, in turn, promotes an increase in the local disturbances rather than an attenuation of them. This effect can result in a relative poor cutting edge quality.

In DE 10 2007 024 700 A1, the laser radiation strikes the irradiation front of a workpiece at relatively small angles of incidence, for example, angles of incidence of less than 80° for the laser material processing of steel at a wavelength of 1 μm. In addition to achieving a maximum Fresnel absorption, a lower gradient of the Fresnel absorption is achieved so that process instabilities are prevented or at least reduced. The relatively small angles of incidence are adjusted by introducing artificial imaging errors that increase a divergence angle of the laser beam compared to the divergence angles brought about by imaging errors of standard optical systems.

As a result, the absorption characteristic is adapted to the irradiation front by reducing the local angles of incidence in the focused laser beam. Since absorption is increased, higher process speeds can be achieved. However, the reduction in angular dependency of the absorption, which accompanies the increase of the absorption, does not increase the processing quality.

Rather, the reduction in angular dependency and the reduced angle of incidence enhances the production of the local disturbances (e.g., waves) and consequently reduces the cutting quality. In addition, the foregoing references do not take into consideration the temperature distribution over the entire irradiation front and the resulting melt flows that extend azimuthally around the laser beam.

SUMMARY

This disclosure relates to reducing the formation of local disturbances (e.g., waves) at an irradiation front of a workpiece irradiated with a laser beam and minimizing disruptive flows of a melt that extend around the laser beam, in which the disturbances and disruptive flows are caused by local and/or the overall vaporization pressure of the melt over a range of the material thickness which has the irradiation front. In some implementations, the methods disclosed herein can be used to improve the quality of the laser material processing operation, including, for example, improving the quality of the cutting edge produced by the laser irradiation.

In certain aspects, to the present disclosure covers adjusting a surface structure of the irradiation front in accordance with a desired processing result. The surface structure of the irradiation front may be adjusted, for example, by modifying beam properties of the laser beam, such as polarization and/or beam profile. For example, in some implementations, the gradient of the absorbed intensity in the range of the angle of incidence around 90° can be influenced based on the polarization of the laser beam.

Alternatively or in addition, the temperature distribution at the irradiation front (and consequently the surface structure of the irradiation front) can be influenced by modifying the beam profile of the laser beam.

That is to say, the beam properties of the laser beam, including, for example, the polarization and/or the beam profile, are adjusted in such a manner to substantially modify, at the irradiation front, the gradient of the absorbed intensity at angles of incidence in the range around 90° and/or to produce a uniform temperature distribution over the range of the material thickness which has the irradiation front.

Due to the substantially modified absorbed intensity and/or temperature distribution, the formation of the undulating irradiation front (i.e., the surface structure of the irradiation front), is dampened during the laser cutting process and/or the development of the undulating irradiation front is reduced. In addition, the melt at the irradiation front exhibits, in some implementations, a relatively constant profile over the material thickness which has the irradiation front. To this end, the absorbed intensity gradient for angles of incidence in the range of 90° is preferably modified or at least adjusted to be similar to the absorbed intensity gradient of circularly polarized laser radiation having a wavelength of 10 μm. The stable process conditions achieved as a result of maximizing the absorbed intensity gradient (e.g., for angles of incidence around) 90° can reduce, in the case of a laser cutting method, the cutting edge roughness, and the corrugation and formation of burrs.

The range of incident angles at the irradiation front is not limited to 90°. Instead, the range of incident angles can extend to any suitable angles that have a corresponding adapted gradient characteristic of the absorbed intensity. For laser cutting performed using irradiation having a wavelength of 1 µm, this primarily corresponds to angles of incidence greater than 80°, such as greater than 84°.

The maximization of the absorbed intensity gradient at angles of incidence in the range around 90° can be performed by selectively adjusting the polarization, such as, for example, adjusting the azimuthal and/or radial polarization. Ideally, the laser radiation for laser cutting should have the highest possible proportion of radial polarization, which extends at least beyond the proportion of radial polarization in the case of random polarization. In particular, a purely radial or almost purely radial polarization is particularly preferred.

When circularly polarized radiation having a wavelength in the range of 10 µm strikes the workpiece, the waves of the melt at the irradiation front are dampened since the radiation is absorbed at high angles of incidence (that is to say, close to 90° angle of incidence) with a high absorption gradient. When randomly polarized laser radiation having a wavelength in the range of 1 µm is used in laser cutting, the radiation is absorbed at the wave side facing the laser beam and consequently at smaller angles of incidence due to the low absorption gradient. As a result, for laser radiation having a wavelength in the range of 1 µm, the waves of the melt are intensified, and the vapor impulse that is produced applies a pressure to the waves in the beam expansion direction and azimuthally around the laser beam. The local varying discharge of melt that results leads to the corrugation and formation of burrs or formation of splashes as described above. In order to reduce or even prevent this effect, the polarization of laser radiation having a wavelength in the range of 1 µm is adjusted so that the Fresnel absorption characteristic or the absorbed intensity (which can be expressed as the product of the Fresnel absorption and the cosine of the angle of incidence) matches a characteristic of laser radiation having a wavelength in the range of 10 µm in order to achieve a similar damping effect.

The adjustment of the desired polarization can be carried out by converting the random polarization of the laser beam into radial polarization in the processing head of a corresponding laser material processing device. In some implementations, the radial polarization can be produced in a laser resonator without significant power loss (as in the conversion in the processing head) and is guided to the processing head or a processing location using polarization-retaining beam guides, such as, for example, mirror-based beam guides or optical transport fibers configured for this purpose.

Furthermore, by changing the spatial intensity distribution of the laser beam, local vaporization that would otherwise be brought about by process temperatures which are locally or generally too high can, in some implementations, be prevented. In turn, this can sometimes lead to an undesirable flow of melt extending azimuthally around the laser beam as a result of increased wave movement.

It is therefore also possible, alternatively or in addition, to selectively adjust the beam profile of the laser beam to achieve a reduction in the formation of waves and/or to prevent undesirable vaporization resulting in a negative azimuthal flow of melt around the laser beam. For example, the temperature input over the irradiation front can be regulated so that properties of the melt are substantially constant over the thickness of the workpiece having the irradiation front in the beam expansion direction, by using a ring shaped spatial beam profile (e.g., where an intensity maximum is located in the outer radius of the beam and the intensity decreases toward the beam axis). As a result, increases in temperature and in vapor, which increase in the beam expansion direction with a vapor pressure impulse on the melt, and which tend to form or further increase the formation of waves or undesirable melt flows can, in some implementations, be reduced and/or prevented.

In certain aspects, the present disclosure also relates to methods for laser cutting a workpiece, in which at least a portion of the workpiece is melted and/or vaporized by using a laser beam and in which a cutting front is formed on the workpiece by the relative movement in an advancing direction between the laser beam and the workpiece. The laser beam can be formed to include at least two radially polarized beam portions, which are offset relative to each other in the advancing direction.

The two radially polarized beam portions, which are offset from each other in the advancing direction, can ensure that associated E vectors (electric field vectors) also are oriented on lower regions of the workpiece (e.g., a metal sheet) parallel with the incident plane so that beam portions are absorbed as much as possible. The effective depth of the radial polarization can thus be substantially increased which results in a wider and parallel cutting channel. The two radially polarized beam portions can be formed by two separate laser beams or by one laser beam having two intensity maxima which are offset with respect to each other in the advancing direction.

In certain aspects, the present disclosure also relates to methods for laser cutting a workpiece, in which at least a portion of the workpiece is melted and/or vaporized using a laser beam and in which a cutting front is formed on the workpiece by the relative movement in an advancing direction between the laser beam and the workpiece. The laser beam can be formed by multiple beam strips that extend along the advancing direction of the laser beam, in which each beam strip has a different linear polarization direction (so-called "strip-polarized" laser beam). Starting from the laser beam longitudinal center plane, the angles formed between the linear polarization direction of each beam strip and the laser beam longitudinal center plane increase in a direction towards the outer beam strips. In some implementations, the linear polarization directions of the beam strips extend parallel with a normal to a front contour of the laser beam that is used for cutting.

Due to the linearly polarized beam strips, the laser radiation strikes the entire cutting front in each workpiece plane in a P-polarized manner, which results in maximum Fresnel absorption for all angles of incidence. Because the effective depth extends over the entire workpiece thickness in strip-polarization, edge indentations do not form in the workpiece and the laser power can be optimally used for cutting speed. As a result of the perpendicular cutting edges, the cutting quality can be improved. Furthermore, as a result of the reduced reflected power, the formation of burrs and surface roughness can be reduced.

The laser beam can have a wavelength in the range of approximately 500 nm to approximately 5 µm (e.g., approximately 1 µm), and is produced using a solid-state laser, such as, for example, a rod laser, disc laser, fiber laser or diode laser. With respect to using multiple beam portions or beam strips, the wavelength range can also be extended to wavelengths of up to approximately 10 µm (e.g., 10.6 µm), as provided by a $CO_2$ laser.

In certain aspects, the present disclosure also relates to a device for laser cutting a workpiece using two radially polarized beam portions and/or a strip-polarized laser beam.

Other advantages will be appreciated from the claims, the description and the drawings. The features set out above and those mentioned below can also be used individually or together in any combination. The embodiments illustrated and described are not intended to be understood to be a definitive listing, but are instead of an exemplary nature to describe the invention.

DESCRIPTION OF DRAWINGS

FIG. 2 is a plot that shows a relationship between polarization-dependent absorbed intensity (Fresnel absorption*cosine (angle of incidence α)) and angle of incidence α at laser wavelengths of 10.6 μm (circularly polarized) and 1 μm (randomly polarized, P-polarized and S-polarized).

FIG. 5 is a schematic that shows an example of a cutting front of a workpiece during laser cutting with a radially polarized laser beam in a longitudinal cross-section.

FIGS. 6a-6c are schematics that show examples of a cutting front of the workpiece of FIG. 5 in three different workpiece planes according to A-C.

FIGS. 7a-7c are schematics that show examples of the cutting front of a workpiece during laser cutting with two radially polarized beam portions, where the polarized beam portions extend parallel with each other (FIG. 7a), are tilted relative to each other (FIG. 7b) or are formed by a single laser beam (FIG. 7c).

DETAILED DESCRIPTION

Figure 1A:
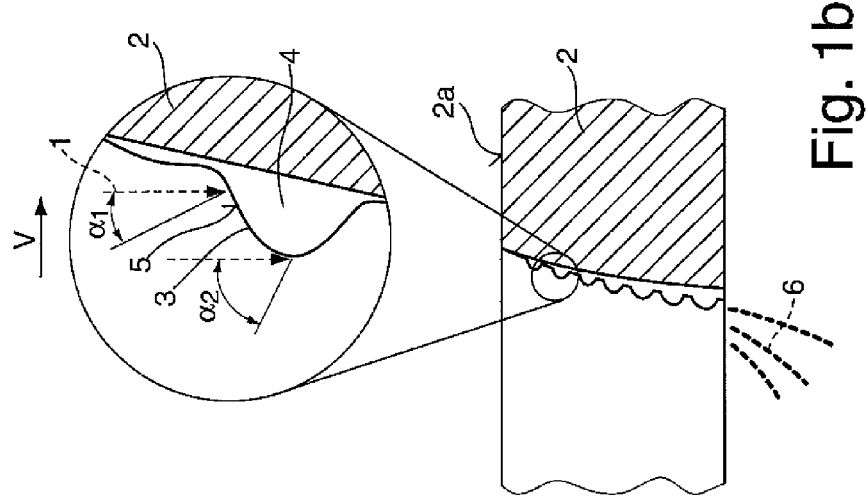
FIGS. 1a, 1b are schematics that show examples of the undulating irradiation front of a workpiece during laser cutting at a laser wavelength of 10.6 μm (FIG. 1a) and 1 μm (FIG. 1b).
Figure 1B:
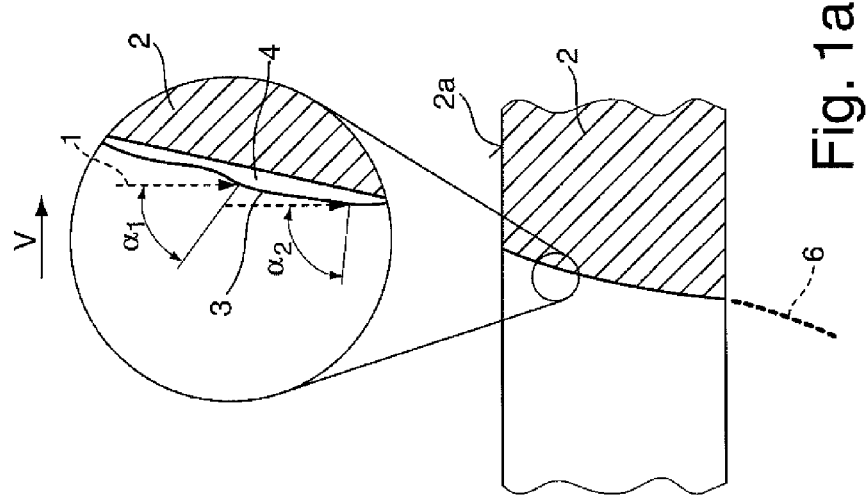

As illustrated in FIGS. 1a and 1b, a portion of a workpiece 2 is molten and/or vaporized at an operating location during laser cutting by a laser beam 1. An irradiation front 3 is formed over the material thickness of the workpiece 2 by the relative movement in the advancing direction (cutting direction v) between the laser beam 1 and the workpiece 2. This irradiation front 3 is located on the melt 4. The laser beam 1 is directed towards the workpiece surface 2a, and faces the surface 2a at an almost perpendicular angle of incidence, e.g., in the range of approximately 70° to 110°.

FIG. 1a is a schematic that illustrates a laser cutting process using a circularly polarized laser beam 1 having a wavelength of 10.6 μm. FIG. 1b is a schematic that illustrates a laser cutting process using a randomly polarized laser beam 1 having a wavelength of approximately 1 μm. Under the irradiation front 3, the melt 4 forms an undulating surface structure that is clearly more pronounced during laser cutting with a beam having a wavelength of 1 μm than in the case of a beam having a wavelength of 10.6 μm. As shown in FIG. 1a, the laser beam 1 strikes the melt 4 locally with substantially identical angles of incidence $\alpha_1$, $\alpha_2$ ($\alpha_1 \approx \alpha_2$), because the undulated structure of the melt surface (i.e., irradiation front) is not very pronounced. As shown in FIG. 1b, the laser beam 1 strikes the melt 4 locally with different angles of incidence (e.g., $\alpha_1$ and $\alpha_2$, where $\alpha_1 < \alpha_2$), because the undulated structure of the melt surface is pronounced. At the wave portions of the melt 4 facing the laser beam 1, i.e., at the wave side 5 facing the laser beam 1, the laser beam 1 strikes the melt 4 with a small angle of incidence so that the major percentage of the beam intensity is absorbed. The wave portions of the melt 4, which extend approximately in the propagation direction of the laser beam 1, cause the light to be incident on the melt 4 at greater angles of incidence $\alpha_2$, which, in turn, results in the melt 4 absorbing less energy from the incidence beam. This causes the waves of the melt 4 to become more pronounced, as the regions around the waves are pressed downwards by a vapour impulse produced by the irradiation. As a result, a temporally and locally irregular discharge 6 of melt is produced in front of and behind the laser beam 1, which leads to formation of burrs and corrugations in the cut workpiece 2, especially with increasing material thickness of the workpiece 2.

The relatively steep gradient of the absorbed intensity at angles of incidence in the range around 90° for laser radiation having a 10.6 μm wavelength brings about a flat wave structure of the melt 4 at the irradiation front 3, as shown in FIG. 1a. The flat wave structure leads to a substantially more regular discharge of melt 6.

The cause of these effects becomes apparent in FIG. 2. That is, FIG. 2 shows a plot of the relationship between polarization-dependent absorption and angle of incidence α at different wavelengths. Laser radiation having a wavelength of 10.6 μm and circular polarization 21 damps waves of the melt 4 since the laser radiation is absorbed to a great extent at large angles of incidence α (near 90°). Laser radiation having a wavelength of 1 μm and random polarization 22 is absorbed to a lesser extend at angles of incidence α near 90°. This means that this type of radiation is better absorbed at the wave side 5 of the melt 4 facing the laser beam 1, where the angle of incidence α is smaller. The waves of the melt 4 are intensified by the laser radiation having a wavelength of 1 μm and these waves are additionally pressed downwards and azimuthally around the laser beam 1 by the vapor pressure induced by the irradiation. In order to prevent the increase of the wave formation that occurs with the laser radiation having a wavelength of 1 μm and to obtain a damping effect comparable with that achieved for laser radiation having a wavelength of 10.6 μm laser radiation, the gradient of the absorbed intensity in the range of the angle of incidence near 90° for the laser cutting has to be maximized or adjusted to be as close as possible to the gradient in absorption intensity at 10 μm.

The absorbed intensity gradient for 1 μm laser radiation can be adjusted or maximized by using a beam with radial polarization 23 or a defined mixture of P-polarization (radial polarization) 23 and S-polarization (azimuthal polarization) 24 thereof for the cutting process. The laser beam 1 can be provided with the desired polarization by means of a suitable polarization device, for example, a segmented polarizing planar optical system in the processing head.

Figure 3B:
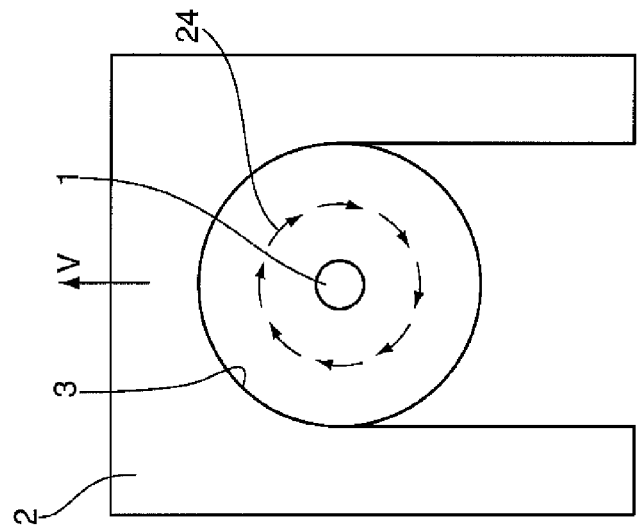
FIGS. 3a, 3b are schematics that show examples of a laser beam with a radial polarization with respect to the irradiation front (FIG. 3a) and with an azimuthal polarization with respect to the irradiation front (FIG. 3b).
Figure 3A:
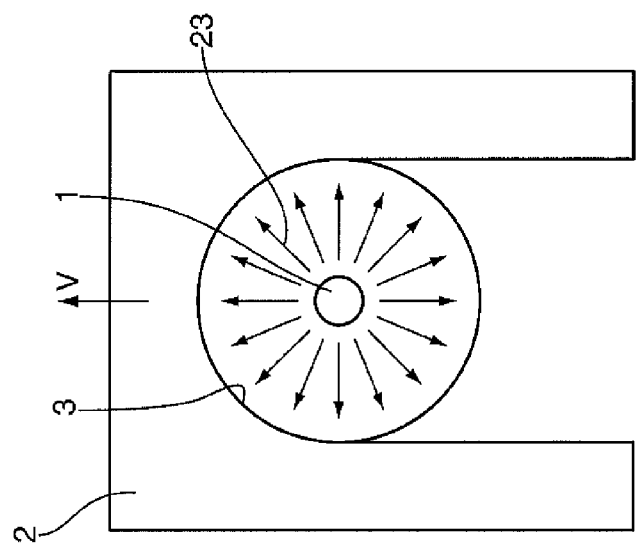

FIG. 3a is a schematic that shows the laser beam 1 having a radial polarization (e.g., P-polarization 23) with respect to an irradiation front 3. FIG. 3b is a schematic that shows the laser beam 1 with azimuthal polarization (e.g., S-polarization 24) with respect to the irradiation front 3.

Figure 4:
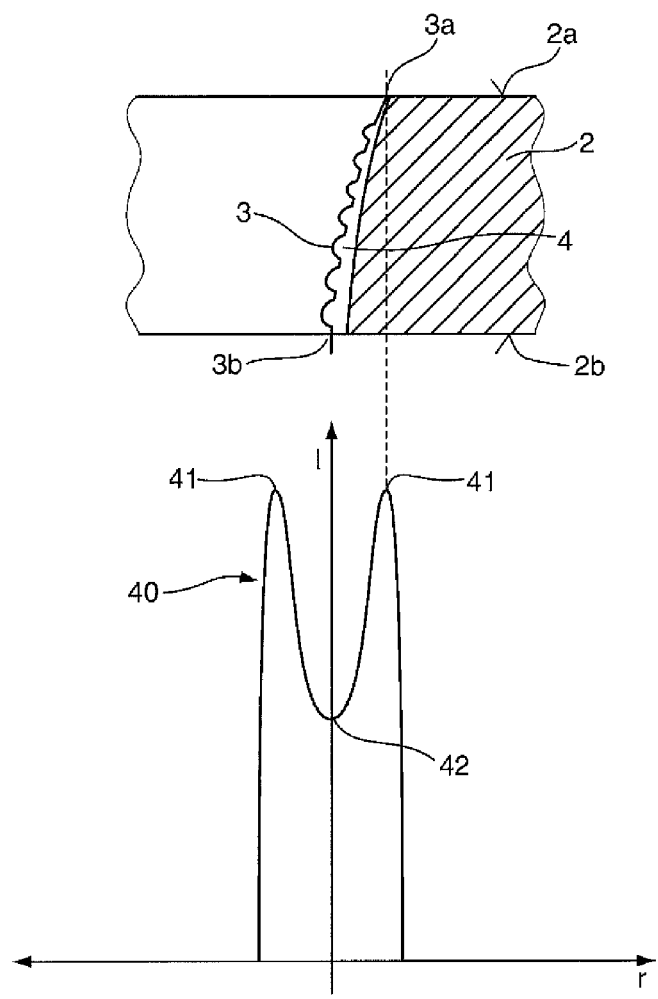
FIG. 4 is a schematic that shows an example of the beam profile of a laser beam for a homogeneous temperature distribution in relation to an irradiation front.

In order to reduce the undulating surface structure of the irradiation front 3 both locally as well as over the workpiece material thickness, a laser beam 1 having a spatial beam profile similar to the spatial beam profile 40 shown in FIG. 4 can be used in addition to or as an alternative to the adjustment of beam polarization. The spatial beam profile 40 has an intensity maximum 41 at an impact location (irradiation front edge) 3a on the workpiece surface 2a that faces the incident laser beam 1. The spatial beam profile 40 decreases in intensity along the irradiation front 3. The intensity falls to a minimum 42 at a lower side 2b of the workpiece 2 corresponding to the location 3b (also an irradiation front edge). The beam radius r covers at least the irradiation front 3. The (negative) slope of the intensity profile from maximum intensity to minimum intensity can be adjusted based on the material thickness, the material depth to be processed, and/or the type of material itself to be processed. In some implementations, the desired intensity distribution may optionally be adjusted during generation of the laser beam, in which the beam is provided to the processing location using mirror-based beam guides or optical fiber units. Alternatively, in some implementations, an intensity distribution having a Gaussian or flat-top intensity profile can be generated using diffractive, reflective or refractive optical systems, or transport fibers in the form of hollow-core fibers or multiclad fibers.

FIG. 5 is a schematic that illustrates the inclined cutting front 50 of a workpiece 51 during laser cutting with a radially polarized laser beam 52. The radially polarized laser beam 52 strikes the workpiece 51 in a perpendicular manner and is moved in an advancing direction v over the workpiece 51. As shown in FIGS. 6a-6c, the cutting front 50 has substantially the same semi-circular cutting front contour, due to the circular laser beam 52, in each cutting plane that is perpendicular to the laser beam axis S. The individual cutting front contours are mutually offset in the laser beam advancing direction v as a result of the cutting front overrun. The circle center point M of the semi-circular cutting front contour coincides at the workpiece upper side 53 (workpiece plane A in FIG. 5) with the laser beam axis S. The deeper the laser beam 52 is introduced into the workpiece 51 (e.g., at workpiece planes B and C in FIG. 5), the further apart the circle center points M of the semi-circular cutting front contours and the laser beam axis S become as a result of the cutting front overrun.

As shown in FIG. 6a, the E vectors (electric field vectors) 54 of the radial polarization constantly oscillate at the workpiece upper side 53 in parallel with the plane of incidence. The plane of incidence corresponds to the plane subtended by the normal vector n of the semi-circular cutting front contour and the beam axis S. Consequently, the radial polarization at the workpiece upper side 53 corresponds entirely to P-polarization, which for all angles of incidence results in a maximum Fresnel absorption. The further the circle center points M of the semi-circular cutting front contours and the beam axis S are spaced apart from each other (e.g., as shown in FIGS. 6b, 6c), the proportion of radial polarization that corresponds to S-polarization at the striking point on the cutting front will increase, on average. At angles of incidence that typically occur during laser cutting, S-polarized light will be absorbed much less by the workpiece than P-polarization. Since the radial polarization comprises entirely P-polarized light at the workpiece upper side 53, but not elsewhere on the workpiece, the cutting channel 55 forms a conical edge inentation as a result of increased absorption at workpiece upper side 53. The formation of the conical edge inentation is undesirable during laser cutting. In addition, as the percentage of absorption decreases with workpiece thickness, only a part of the laser beam power is actually effective.

FIG. 7a-7c are schematics that show an inclined cutting front 70 of a workpiece 71 during laser cutting with a laser beam 72 in an implementation of the inventive method, in which the laser beam 72 is formed from two radially polarized beam portions 72a, 72b (e.g., laser radiation having a wavelength of 1 μm) and in which the laser beam 72 is moved in an advancing direction v over the workpiece 51. The two beam portions 72a, 72b are offset relative to each other in the advancing direction v: the beam portion 72a leads in the advancing direction and strikes the workpiece upper side 73 in a perpendicular manner. In some implementations, the leading beam portion 72a has a higher power density than the trailing beam portion 72b. In FIG. 7a, the trailing beam portion 72b extends parallel with at least a portion of the leading beam portion 72a and consequently also strikes the workpiece upper side 73 in a perpendicular manner. In FIG. 7b, the trailing beam portion 72b extends in a tilted manner with respect to the leading beam portion 72a. In some implementations, the trailing beam portion 72b is parallel with or almost parallel with the inclined cutting front 70. In FIG. 7c, both beam portions 72a, 72b are formed using a single laser beam 72 having two intensity maxima, in which each intensity maximum is offset relative to the other in the advancing direction v.

Figures 8A, 8B, 8C:
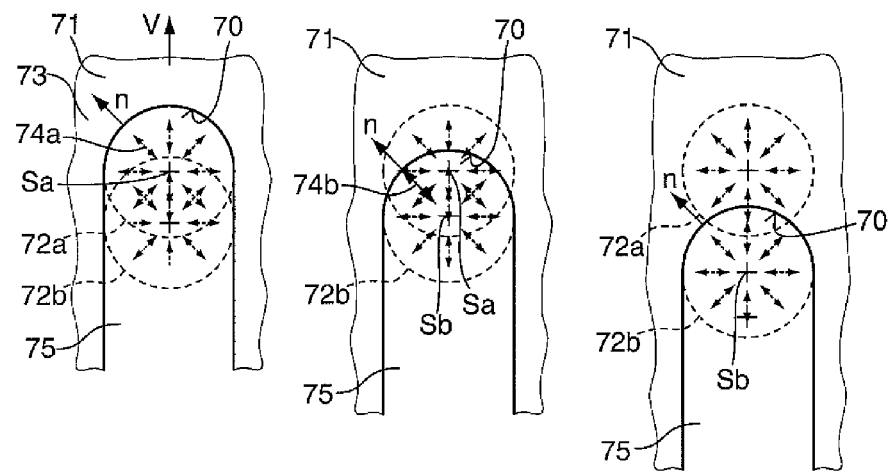
FIGS. 8a-8c are schematics that show examples of the cutting front of the workpiece of FIG. 7 in three different workpiece planes according to A-C.

As shown in FIG. 8a, the E vectors 74a of the radial polarization of the leading beam portion 72a oscillate at the workpiece upper side 73 (workpiece plane A) in parallel with the plane of incidence. The plane of incidence is subtended by the normal vector n of the semi-circular cutting front contour and the beam axis Sa of the leading beam portion 72a. Consequently, maximum absorption of leading beam portion 72a can be obtained.

As shown in FIG. 8b, the E vectors 74b of the radial polarization of the trailing beam portion 72b oscillate in the workpiece center region (workpiece plane B) in parallel with the plane of incidence. In this case, the plane of incidence is defined by the normal vector n of the semi-circular cutting front contour and the beam axis Sb of the trailing beam portion 72b. Consequently, maximum absorption of the trailing beam portion 72b can be obtained.

Compared to the process shown in FIG. 6c, the trailing beam portion 72b also is better absorbed at the workpiece lower side (workpiece plane C in FIG. 8c).

The two radially polarized beam portions 72a, 72b, which are offset relative to each other in the advancing direction v, ensure that the associated E vectors 74a, 74b are also parallel with the plane of incidence in the central and lower region of the metal sheet. As a result, the absorption of energy associate with E vectors 74a and 74b can, in some implementations, be maximized, such that the effective depth of the radial polarization is substantially increased. An increase in the effective depth of the radial polarization can lead to a more constant energy input through the thickness of the workpiece and consequently a generally parallel cutting channel 7 i.e., a reduction in cutting edge inclination. At the same time, the width of the cutting channel, at least in the central and lower region of the workpiece, can be increased as a result of the additional energy absorption. The wider cutting channel, in turn, can lead to an improved effect of the cutting gas, reducing the amount of time necessary to cut the workpiece with the laser beam, such that the advancing speed can be increased.

In FIG. 7b, the radial polarization of the tilted trailing beam portion 72b includes substantially P-polarized light over the entire cutting front 70. The trailing beam portion 72b strikes the inclined cutting front 70 at the Brewster angle, such that maximum absorption is achieved in the lower workpiece region and the width of the cutting channel 75 is increased.

The two radially polarized beam portions 72a, 72b, which are shown in FIGS. 7a and 7b, may be produced from a single radially polarized laser beam. For example, the beam portions may be produced by splitting a single radially polarized laser beam using a beam splitter, such as a wedge plate, which protrudes into the laser beam.

The beam profile shown in FIG. 7c, which has two intensity maxima, may be produced or shaped from a laser beam that has already been radially polarized using an optical imaging system (e.g., a diffractive optical system). Alternatively, a beam-shaping optical element may produce the radial polarization.

Figure 9:
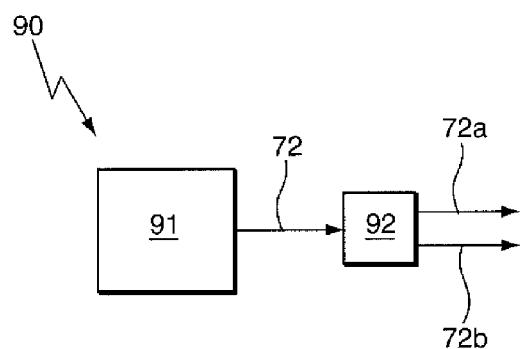
FIG. 9 is a schematic that illustrates an example of a laser cutting device for producing two radially polarized beam portions.

FIG. 9 is a schematic that illustrates a laser cutting device 90 having a laser generator 91 for producing a laser beam. For example, the laser beam can include a radially polarized laser beam 72. The laser cutting device 90 also includes a device 92 for producing the two radially polarized beam portions 72a, 72b from the laser beam 72. As described above, the device 92 can include, for example, a beam splitter or an optical beam-shaping system or element.

Figures 10A, 10B, 10C:
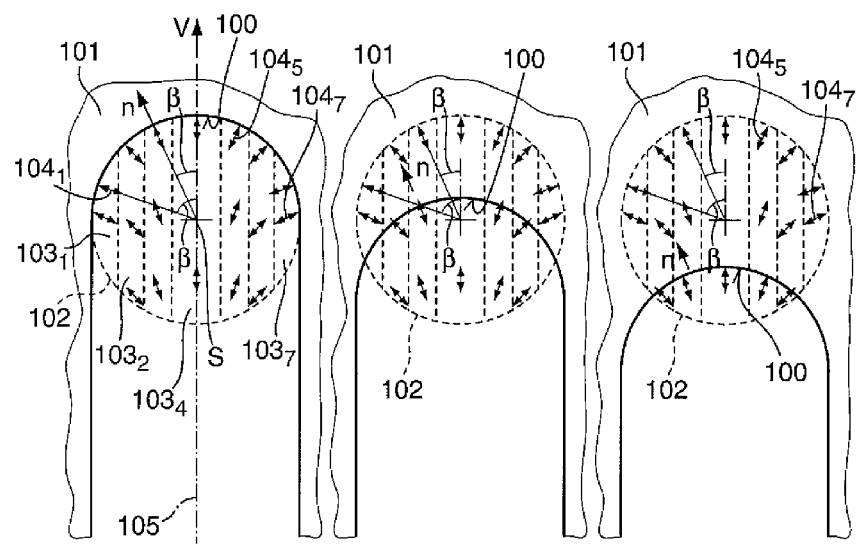
FIGS. 10a-10c are schematics that show the cutting front of the workpiece of FIG. 7 during laser cutting with a strip-polarized laser beam in three different workpiece planes according to A-C.

FIGS. 10a-10c are schematics that illustrate a semi-circular cutting front 100 of a workpiece 101 during laser cutting at three different workpiece planes corresponding to planes A-C in FIG. 7, using a so-called "strip-polarized" circular laser beam 102 (e.g., a laser beam having a wavelength of 1 μm). Though a circular laser beam 102 is shown in FIGS. 10a-10c, other suitable beam cross-sections also can be used.

In the examples of FIGS. 10a-10c, the "strip-polarized" laser beam 102 is formed by multiple beam strips 1031-1037 (e.g., seven beam strips, as shown in FIGS. 10a-10c) that extend in the advancing direction v of the laser beam, in which each strip has a different linear polarization direction (i.e., polarization vector) 1041-1047. The beam strips 1031-1037 are illustrated in sequential order in FIGS. 10a-10c. For ease of viewing, the reference characters for beam strips 1033, 1035, and 1036 are not shown in the figures. Similarly, the linear polarization directions are illustrated in FIGS. 10a-10c in sequential order coinciding with their corresponding beam strip. Again, for ease of viewing, the reference characters for polarization directions 1042, 1043, 1044, and 1046 are not show in the figures.

Starting from the laser beam longitudinal center plane (strip center plane) 105, which extends along the advancing direction v, the angles β between the linear polarization directions 1041-1047 and the laser beam longitudinal center plane 105 increase from the central beam strip 1034 towards the two outer beam strips 1031 and 1037. The linear polarization directions 1041-1047 in the beam strips 1031-1037 are selected in such a manner that each linear polarization direction extends in parallel with a normal of the cutting-front front contour of the beam strip with which the linear polarization direction is associated. In the case of a circular laser beam (see, e.g., laser beam 102 in FIGS. 10a-10c), the polarization directions 1041-1047 in the individual beam strips 1031-1037 are selected in such a manner that they point to the beam center point axis S at the cutting-front front contour. In the individual beam strips 1031-1037, therefore, the polarization direction is selected in such a manner that the E vectors 1041-1047 of the incident laser beam 102 oscillate over the entire workpiece thickness practically parallel with the respective plane of incidence so that the maximum possible absorption can be achieved. That is to say, quasi-radial polarization is produced locally along the cutting front 100.

As shown in FIGS. 10a-10c, as a result of the linearly polarized beam strips 1031-1037, the laser radiation 102 strikes at the entire cutting front 100 and in each workpiece plane in a P-polarized manner, which leads to a maximum Fresnel absorption and absorbed intensity for all angles of incidence. Since, with the strip-polarization, the effective depth of absorption extends over the entire thickness of the workpiece, there is no edge indentation and the laser power can be optimally used for cutting speed. Furthermore, the cutting quality can be improved as a result to the perpendicular cutting edges. Furthermore, the formation of burrs and surface-roughness can be reduced as a result of a reduction in reflected power.

The total number of beam strips 1031-1037 and the width of each strip may be varied, though at least two beam strips are required for operation of the device. In addition, the strips do not need to be constructed in parallel but may, for example, have a wedge-like arrangement.

Figure 11:
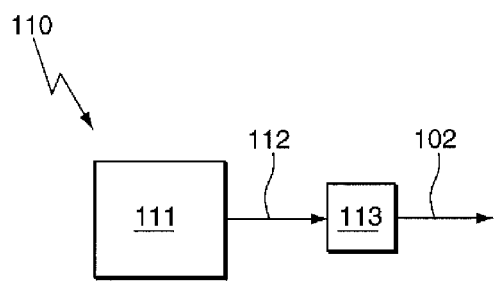
FIG. 11 is a schematic that illustrates an example of a laser cutting device for producing a strip-polarized laser beam.

FIG. 11 is a schematic that illustrates a laser cutting device 110 that includes a laser generator 111 for producing a laser beam 112, and that includes a strip polarizer 113 for producing a laser beam 102 with linearly polarized beam strips 1031-1037 from the laser beam 112. The strip polarizer 113 is direction-dependent, i.e., the strip polarizer has to be orientated relative to the advancing direction v so that the E vectors 1041-1047 oscillate parallel with the plane of incidence. In the case of a linearly polarized laser beam 112 that strikes the strip polarizer 113, this beam 112 has to be rotated in the right way relative to the strip polarizer.

Figure 12:
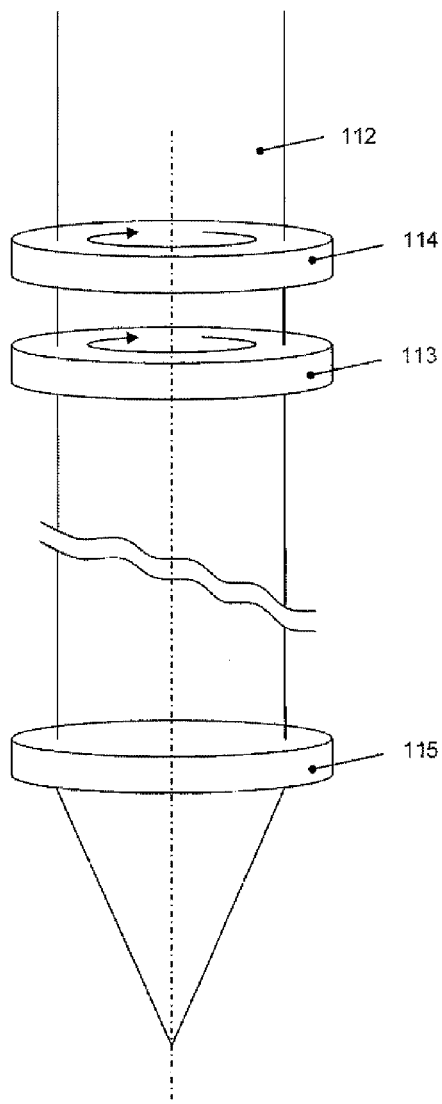
FIG. 12 is a schematic that illustrates an example of a strip polarizer, which can be rotated about a laser beam axis, and a polarization converter which can be rotated about a laser beam axis.

As shown in FIG. 12, a polarization convertor 114 is arranged upstream of the strip polarizer 113. The polarization converter can include, for example, a rotatable λ/2 plate that can be rotated about the laser beam axis. Similarly, the strip polarizer 113 also can be rotated about the laser beam axis, in order to rotate the linear polarization direction of the incident laser beam 112. The angles of rotation of both optical components 113, 114 do not necessarily have to be the same. To this end, the optical components 113 and 114 may be either rotated independently of each other or may be coupled to each other.

The rotatable polarization convertor 114 is not limited to being used with a strip polarizer 113 (which is also rotatable), but can generally be used in other direction-dependent optical polarization systems.

The linear polarization of the incident laser beam 112 can be generated internally in a resonator (e.g., in a laser generator 111) or through the use of an optical conversion system (not illustrated). In either case, the linearly polarized beam can be supplied to the polarization convertor 114 or the strip polarizer 113 as a beam propagating in free space or through a polarization-retaining fiber.

The optical components 113, 114 may be constructed in a transmissive (lenses) or a reflective manner (mirrors) depending on the beam path. In addition, the strip polarizer 113 does not necessarily have to be arranged directly upstream of the focusing system (e.g., a focusing lens 115 as shown in FIG. 12), but may be provided at other locations along the beam guide or in the laser generator 111.

A number of embodiments have been described. Nevertheless, it will be understood that various modifications may be made without departing from the spirit and scope of the invention. Accordingly, other embodiments are within the scope of the following claims.

What is claimed is:

1. A method for cutting a workpiece with a laser beam, the method comprising:
    using the laser beam to melt, vaporize, or both melt and vaporize at least a portion of the workpiece;
    moving at least one of the workpiece and the laser beam relative to one another in an advancing direction to form a cutting front on the workpiece,
    wherein the laser beam comprises a plurality of parallel laser beam strips extending along the advancing direction, wherein each laser beam strip has a different linear polarization direction, and wherein the advancing direction corresponds to a direction along which the workpiece is cut by the laser beam.

2. The method according to claim 1, wherein the linear polarization direction of each laser beam strip subtends a corresponding angle to a longitudinal center plane of the laser beam, and an angle size increases from the beam strips arranged near the longitudinal center plane toward the beam strips arranged furthest from the longitudinal center plane.

3. A method for cutting a workpiece with a laser beam, the method comprising:
    using the laser beam to melt, vaporize, or both melt and vaporize at least a portion of the workpiece;
    moving at least one of the workpiece and the laser beam relative to one another in an advancing direction to form a cutting front on the workpiece,
    wherein the laser beam comprises at least two different radially polarized beam portions offset relative to each other along the advancing direction,
    wherein the at least two radially polarized beam portions comprise a leading beam portion and a trailing beam portion, the leading beam portion being at least partially in front of the trailing beam portion in the advancing direction,
    wherein the electric field vectors of the of the radial polarization of the leading beam portion oscillate at an upper side of the workpiece in parallel with a first plane of incidence subtended by the normal vector of the semicircular cutting front contour and the beam axis of the leading beam portion, and
    wherein the electric field vectors of the radial polarization of the trailing laser beam portion oscillate in a center region of the workpiece in parallel with a second plane of incidence defined by the normal vector of the semicircular cutting front contour and the beam axis of the trailing beam portion.

4. The method according to claim 3, wherein the leading beam portion is incident on the upper side of the workpiece at an angle that is approximately perpendicular to the upper side.

5. The method according to claim 3, wherein the leading beam portion has a higher power density than the trailing beam portion.

6. The method according to claim 3, wherein the trailing beam portion propagates parallel or tilted with respect to the leading beam portion.

7. The method according to claim 3, wherein the trailing beam portion propagates substantially parallel to the cutting front.

8. The method according to claim 3, wherein the leading beam portion and the trailing beam portion correspond to a first local intensity maximum and a second local intensity maximum of the laser beam, respectively, and wherein the two intensity maxima are offset with respect to each other along the advancing direction.

9. The method according to claim 2, wherein the laser beam comprises a front contour extending over the plurality of laser beam strips, the front contour being located at the cutting front of the workpiece, and wherein the linear polarization direction of each laser beam strip extends along a direction normal to a portion of the front contour associated with the laser beam strip.

10. The method according to claim 2, wherein the linear polarization directions of the beam strips are rotated in accordance with the advancing direction.

11. The method according to claim 1 or 3, wherein the laser beam has a wavelength in the range from approximately 500 nm to approximately 5 µm.

12. The method according to claim 3, wherein the leading beam portion is incident on the upper side of the workpiece at an angle between approximately 70° and approximately 110°.

13. A method for laser material processing of a workpiece, the method comprising:
    using a laser beam to melt, vaporize, or both melt and vaporize a portion of the workpiece;
    moving at least one of the workpiece and the laser beam relative to one another to form an irradiation front,
    wherein the laser beam comprises a spatial beam profile that is an inverse Gaussian profile having a ring-shaped intensity profile, a maximum intensity occurs along a portion of the beam profile corresponding to an outer radius of the laser beam, and the intensity decreases towards the center of the beam profile; and
    adjusting the spatial beam profile so that a portion of the maximum intensity substantially coincides with a first edge of the irradiation front edge located at a side of the workpiece facing the incident laser beam, and so that a portion of a minimum intensity of the spatial beam profile substantially coincides with a second edge of the irradiation front at a side of the workpiece that faces away from the incident laser beam.

* * * * *

UNITED STATES PATENT AND TRADEMARK OFFICE
CERTIFICATE OF CORRECTION

| | | |
|---|---|---|
| PATENT NO. | : 9,061,376 B2 | Page 1 of 1 |
| APPLICATION NO. | : 13/708016 | |
| DATED | : June 23, 2015 | |
| INVENTOR(S) | : Tim Hesse et al. | |

It is certified that error appears in the above-identified patent and that said Letters Patent is hereby corrected as shown below:

ON THE TITLE PAGE

On the first page, column 2 under "Other Publications", delete "Segement" and insert --Segment--.

IN THE CLAIMS

At column 11, line 37, in Claim 3, delete "of the of the" and insert --of the--.

Signed and Sealed this
Sixteenth Day of February, 2016

Michelle K. Lee
*Director of the United States Patent and Trademark Office*